(12) United States Patent
Lee

(10) Patent No.: US 11,686,435 B2
(45) Date of Patent: Jun. 27, 2023

(54) HIGH ALTITUDE ATMOSPHERIC ENERGY STORING APPARATUS

(71) Applicant: Nak Young Lee, Seongnam-si (KR)

(72) Inventor: Nak Young Lee, Seongnam-si (KR)

( * ) Notice: Subject to any disclaimer, the term of this patent is extended or adjusted under 35 U.S.C. 154(b) by 259 days.

(21) Appl. No.: 16/757,514

(22) PCT Filed: Nov. 14, 2018

(86) PCT No.: PCT/KR2018/013878
§ 371 (c)(1),
(2) Date: Apr. 20, 2020

(87) PCT Pub. No.: WO2019/098664
PCT Pub. Date: May 23, 2019

(65) Prior Publication Data
US 2020/0247520 A1  Aug. 6, 2020

(30) Foreign Application Priority Data
Nov. 16, 2017  (KR) ........................ 10-2017-0153227

(51) Int. Cl.
*B64B 1/50* (2006.01)
*B64B 1/58* (2006.01)
(Continued)

(52) U.S. Cl.
CPC ................ *F17C 5/06* (2013.01); *F17C 13/04* (2013.01); *B64B 1/50* (2013.01); *B64F 3/00* (2013.01);
(Continued)

(58) Field of Classification Search
CPC .................. F17C 5/06; F17C 2221/031; F17C 2227/0135; F17C 2270/0186; F17C 5/00;
(Continued)

(56) References Cited

U.S. PATENT DOCUMENTS 4,204,805 A  *  5/1980  Bolie ..................... F03D 3/067
                                                        416/197 A
6,224,015 B1    5/2001  Reinhard
(Continued)

FOREIGN PATENT DOCUMENTS

| KR | 10-2003-0050310 A | 6/2003 |
| KR | 10-2005-0035623 A | 4/2005 |
| KR | 10-2005-0040401 A | 5/2005 |

*Primary Examiner* — Paul J Gray
(74) *Attorney, Agent, or Firm* — KORUS Patent, LLC; Seong Il Jeong

(57) ABSTRACT

A high altitude atmospheric energy storing apparatus having a new structure, which is conceived to store the energy of low-temperature air located at high altitude in the sky and utilize it as needed, is provided. The high altitude atmospheric energy storing apparatus includes an air tank adapted to store air, an air supply pipe provided such that it extends in a vertical direction and its lower end is connected to the air tank, and a compression device provided in the sky, connected to the upper end of the air supply pipe, and configured to compress air using the wind and supply the compressed air to the air tank through the air supply pipe, thereby enabling air to be compressed by the wind blowing at high altitude and to be then stored in the air tank.

6 Claims, 8 Drawing Sheets

(51) Int. Cl.
    *F17C 5/06*          (2006.01)
    *F17C 13/04*        (2006.01)
    *B64F 3/00*          (2006.01)
    *F03D 9/28*          (2016.01)

(52) U.S. Cl.
    CPC .......... *F03D 9/28* (2016.05); *F05B 2240/922* (2013.01); *F17C 2205/0323* (2013.01); *F17C 2221/031* (2013.01); *F17C 2227/0135* (2013.01); *F17C 2270/0186* (2013.01)

(58) Field of Classification Search
    CPC ..... B64B 1/50; B64B 1/66; B64B 1/58; B64F 3/00; F03D 9/28; F05B 2240/922; H02N 11/002
    USPC .......................................................... 417/61
    See application file for complete search history.

(56) References Cited

U.S. PATENT DOCUMENTS

| | | | |
|---|---|---|---|
| 7,362,004 B2 * | 4/2008 | Becker | F03D 9/25 290/55 |
| 2010/0283253 A1 * | 11/2010 | Bevirt | F03D 9/32 290/55 |
| 2012/0091261 A1 * | 4/2012 | Lee | D07B 1/12 244/33 |
| 2015/0021427 A1 * | 1/2015 | Heppe | B64B 1/50 244/31 |
| 2015/0053255 A1 * | 2/2015 | Goldstein | B64B 1/50 136/246 |
| 2015/0097086 A1 * | 4/2015 | Schaefer | G05D 1/0866 244/175 |
| 2015/0106138 A1 | 4/2015 | Fisher | |

* cited by examiner

HIGH ALTITUDE ATMOSPHERIC ENERGY STORING APPARATUS

TECHNICAL FIELD

The present invention relates to a high altitude atmospheric energy storing apparatus having a new structure, which is conceived to store the energy of low-temperature air located at high altitude in the sky and utilize it as needed.

BACKGROUND ART

According to observational data, the temperature of the atmosphere decreases by about 6° C. for an altitude increase of 1 km, and strong winds always blow at high altitudes in areas where jet streams pass. These winds have a lot of kinetic energy.

Furthermore, atmospheric particles are charged due to air friction in the air at high altitude, and the air has abundant electrical energy. This atmosphere forms a voltage difference with the ground, which constitutes a lightning strike when it is about 1 billion volts or more. When an electricity storage device is installed between the atmosphere and the ground before the potential difference between the atmosphere and clouds becomes an ultra-high voltage, a certain level of electrical energy can be stored.

However, so far, there has been no effective way to store and utilize various types of high-altitude energy. Therefore, a new type of energy storage device and method are required.

DISCLOSURE

Technical Problem

The present invention has been conceived to overcome the above-described problems, and an object of the present invention is to provide a high altitude atmospheric energy storing apparatus having a new structure, which is conceived to store the energy of air located at high altitude and utilize it as needed.

Technical Solution

In order to accomplish the above-described object, the present invention provides a high altitude atmospheric energy storing apparatus including: an air tank (10) adapted to store air; an air supply pipe (20) provided such that it extends in a vertical direction and its lower end is connected to the air tank (10); and a compression means (30) provided in the sky, connected to the upper end of the air supply pipe (20), and configured to compress air by using the wind and supply the compressed air to the air tank (10) through the air supply pipe (20).

According to another feature of the present invention, there is provided the high altitude atmospheric energy storing apparatus, further including: a buoyancy body (40) connected to the compression means (30), and configured to provide buoyancy so that the compression means (30) floats in the sky.

According to still another feature of the present invention, there is provided the high altitude atmospheric energy storing apparatus, further including: a conductive layer (60) formed on the circumferential surface of the compression means (30), and an electricity storage means (70) connected to the conductive layer (60) and configured to store electricity applied to the conductive layer (60).

According to still another feature of the present invention, there is provided the high altitude atmospheric energy storing apparatus, further including: a fastening cable (50) configured such that the upper end thereof is connected to the compression means (30) or the buoyancy body (40) and the lower end thereof is fastened to the ground.

According to still another feature of the present invention, there is provided the high altitude atmospheric energy storing apparatus, further including: an opening/closing valve (80) provided in the intermediate portion of the air supply pipe (20) and configured to selectively opening and closing the intermediate portion of the air supply pipe (20), and an air supply pump (90) provided in the intermediate lower portion of the air supply pipe (20) and configured to suck high-altitude air through the compression means (30) and the air supply pipe (20), compress the sucked air, and store the compressed air in the air tank (10).

Advantageous Effects

The high altitude atmospheric energy storing apparatus according to the present invention includes the air tank (10) adapted to store air, the air supply pipe (20) provided such that it extends in a vertical direction and its lower end is connected to the air tank (10), and the compression means (30) provided in the sky, connected to the upper end of the air supply pipe (20), and configured to compress air by using the wind and supply the compressed air to the air tank (10) through the air supply pipe (20), thereby enabling air to be compressed by the wind blowing at high altitude and to be then stored in the air tank (10).

Accordingly, compressed air may be generated without requiring a separate power source, and various types of devices are operated by using the compressed air, thereby supplying environment-friendly energy.

In addition, electricity that is collected via the conductive layer on the surfaces of the compression means (30) and the buoyancy body (40) is stored in the electricity storage device (70), thereby additionally supplying environment-friendly electrical energy.

BEST MODE

Figure 1:
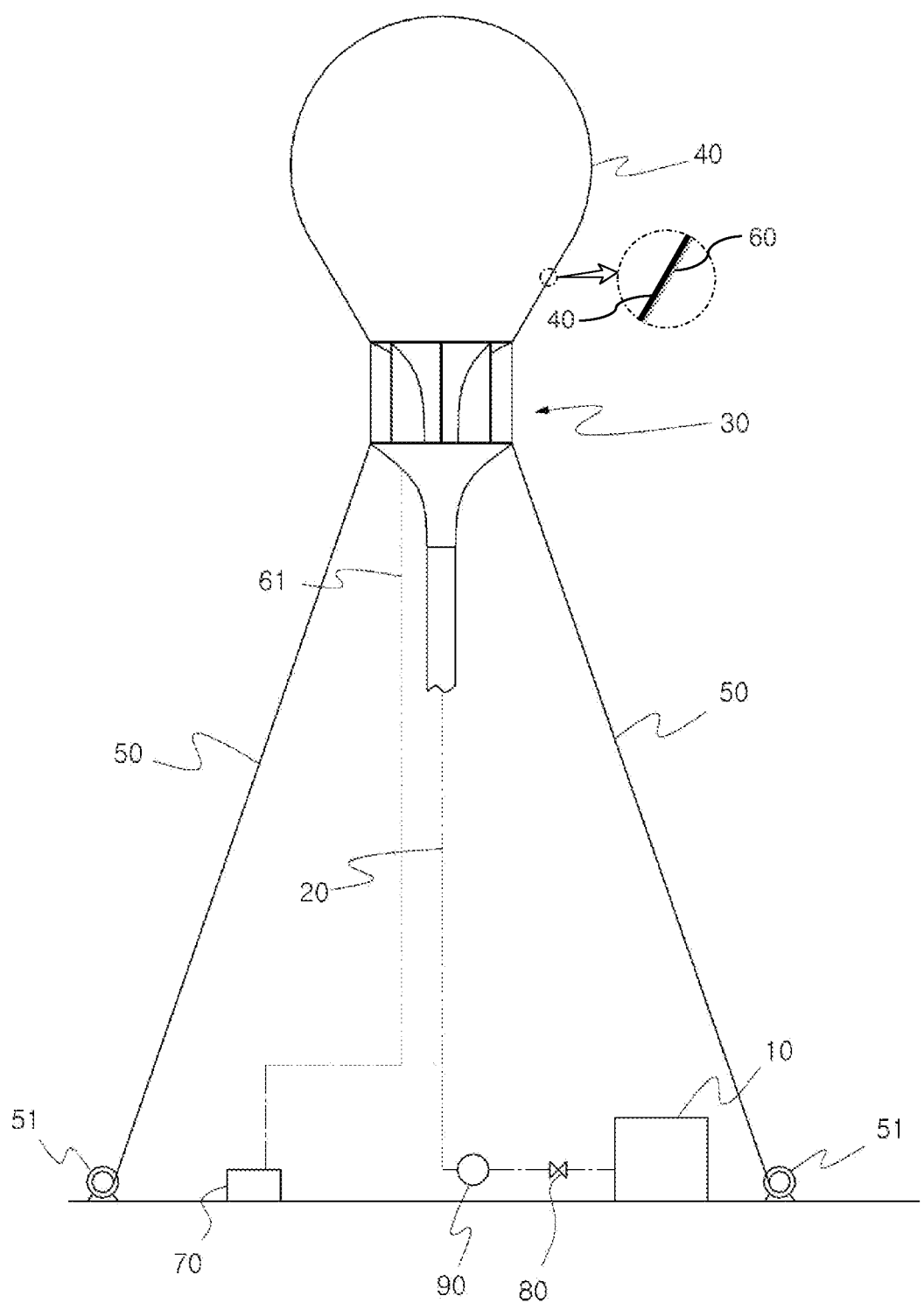
FIG. 1 is a diagram showing the configuration of a high altitude atmospheric energy storing apparatus according to the present invention.

The present invention is intended to provide a high altitude atmospheric energy storing apparatus including: an air tank (10) fabricated to store air; an air supply pipe (20) provided such that it extends in a vertical direction and its lower end is connected to the air tank (10); and a compression means (30) provided in the sky, connected to an upper end of the air supply pipe (20), and configured to compress air by using the wind and supply the compressed air to the air tank (10) through the air supply pipe (20).

MODE FOR INVENTION

The present invention will be described in detail below with reference to the accompanying exemplary drawings below.

FIGS. 1 to 4 show a high altitude atmospheric energy storing apparatus according to the present invention, which includes: an air tank 10 adapted to store air; an air supply pipe 20 provided such that it extends in a vertical direction and its lower end is connected to the air tank 10; a compression means 30 provided in the sky, connected to the upper end of the air supply pipe 20, and configured to compress air by using the wind and supply the compressed air to the air tank 10 through the air supply pipe 20; a buoyancy body 40 provided on the compression means 30, configured to provide buoyancy so that the compression means 30 floats in the sky, and coated with a conductive layer on the surface thereof; a fastening cable 50 configured such that the upper end thereof is connected to the compression means 30 and the lower end thereof is fastened to the ground; a conductive layer 60 formed on the surface of the compression means 30; a down conductor 61 connected to the conductive layer 60 and configured to transfer generated electricity, and an electricity storage means 70 configured to store electricity; an opening/closing valve 80 provided in the lower portion of the air supply pipe 20, and configured to selectively opening and closing the air supply pipe 20; and an air supply pump 90 provided in the lower portion of the air supply pipe 20.

In greater detail, the air tank 10 is fabricated in the shape of a general metallic tank, and is installed on the ground. As will be described later, the air tank 10 is fabricated to store low-temperature compressed air that is supplied through the compression means 30 and the air supply pipe 20.

In this case, the air tank 10 may be provided with a separate output exhaust pipe and various types of equipment may be connected to the output exhaust pipe and then operated, or the air tank 10 may be may be used to supply cooling air.

The air supply pipe 20 may be made of a synthetic resin material having appropriate elasticity and strength, and may be also made of a metal material having an insulation function.

Figure 2:
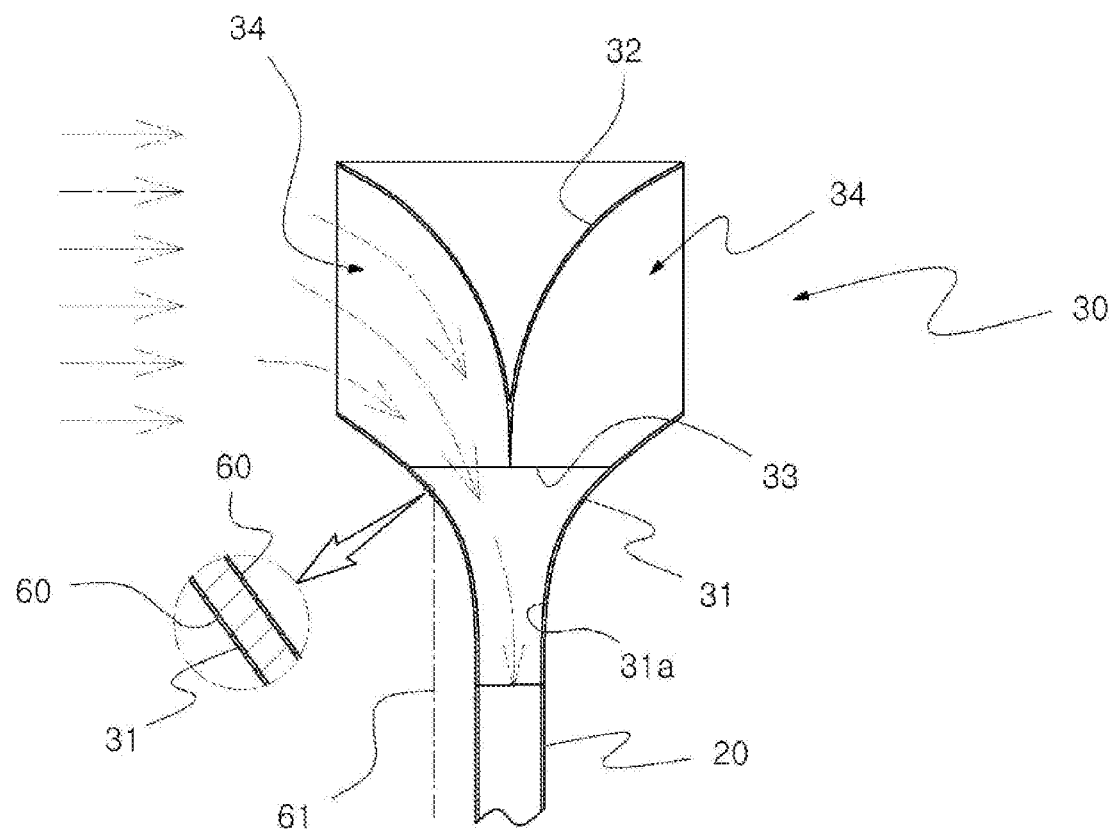
FIG. 2 is a side sectional view showing the compression means of the high altitude atmospheric energy storing apparatus according to the present invention.
Figure 3:
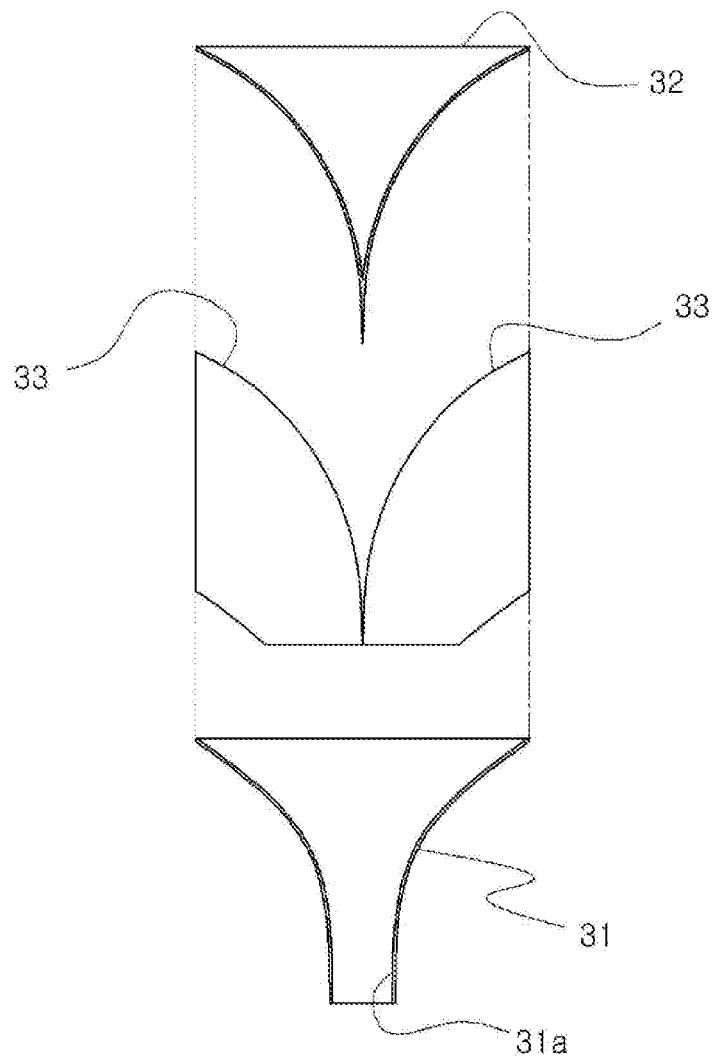
FIG. 3 is a side sectional view showing the disassembled state of the compression means of the high altitude atmospheric energy storing apparatus according to the present invention.
Figure 4:
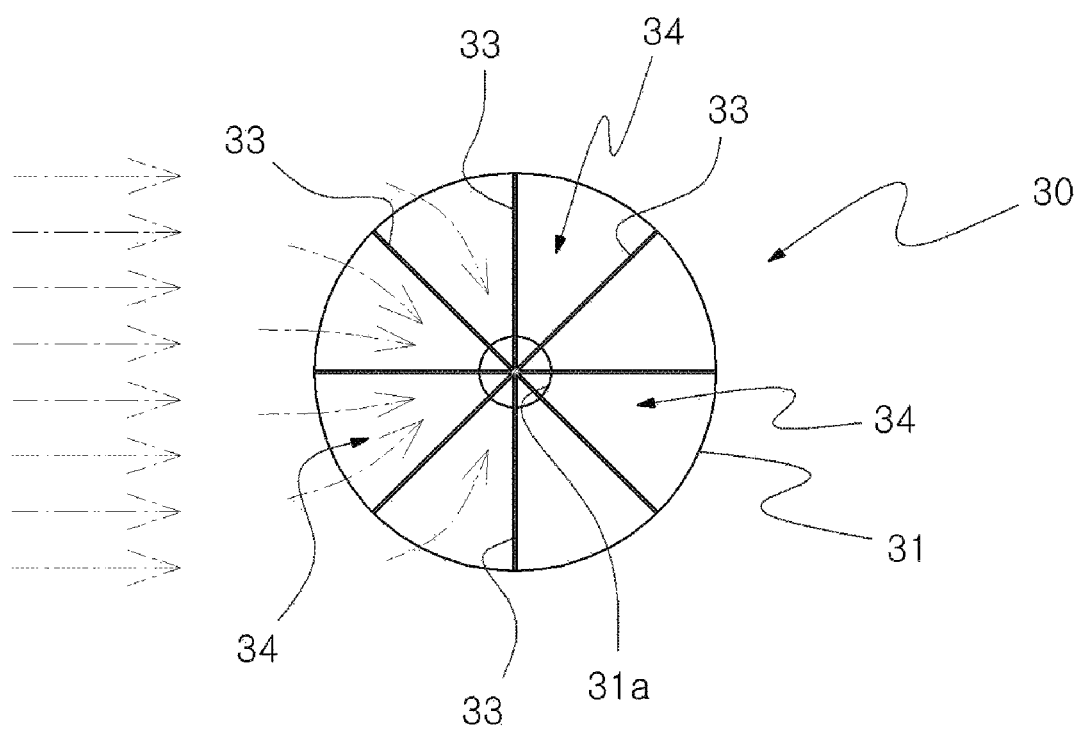
FIG. 4 is a sectional plan view showing the compression means of the high altitude atmospheric energy storing apparatus according to the present invention.

As shown in FIGS. 2 to 4, the compression means 30 includes: a lower plate 31 configured such that an exhaust hole 31a is formed in the lower side of the center portion thereof; an upper plate 32 spaced apart upward from the top surface of the lower plate 31; and a plurality of partition plates 33 provided to extend from the exhaust hole 31a in a radial direction between the lower plate 31 and the upper plate 32 and to form a plurality of air supply passages 34, through which air flows therethrough, between the lower plate 31 and the upper plate 32.

In this case, the lower plate 31, the upper plate 32 and the partition plates 33 are configured to be lowered toward the center portions thereof.

In other words, the lower plate 31 is configured in a funnel shape that is lowered toward the exhaust hole 31a.

The upper plate 32 is configured in a cone shape the center portion of which protrudes downward.

The partition plates 33 are configured in vertically erected panel shapes, and the upper and lower ends of the partition plates 33 are configured to fit the top surface of the lower plate 31 and the bottom surface of the upper plate 32.

Furthermore, the lower plate 31, the partition plates 33, and the upper plate 32 are configured such that the area of the air supply passage 34 is reduced toward the center portion thereof.

Accordingly, when a wind blows from a surrounding place, air gradually increases in speed while flowing into the compression means 30 along the air supply passage 34, and is then supplied downward to the air supply pipe 20 through the exhaust hole 31a.

In this case, the compression means 30 is located about 2 km above the ground.

The buoyancy body 40 is configured in a balloon shape filled with helium gas or the like having a low specific gravity therein, and is fastened to the top side of the compression means 30, so that the compression means 30 can float about 2 km above the ground. Furthermore, the conductive layer including a metal mesh or a conductive material is present on the surface of the buoyancy body 40, thereby functioning to protect the buoyancy body 40 from lightning and to absorb charges in the atmosphere.

The fastening cable 50 is made of a synthetic resin and a new material having high strength and ductility and excellent dielectric strength, and performs fastening so that the compression means 30 and the buoyancy body 40 do not move. A winch 51 fastened to the ground is provided at the lower end of the fastening cable 50, and is configured to adjust the heights of the buoyancy body 40 and the compression means 30 or lower them to the ground by unwinding or winding the winch 51.

The conductive layer 60 is formed by attaching a fine metal mesh onto the surfaces of the lower plate 31, the partition plates 33 and the upper plate 32 or applying a conductive coating onto the surfaces of the lower plate 31, the partition plates 33 and the upper plate 32. The conductive layer 60 is connected to the electricity storage means 70 by a connection line 61, and functions to collect electricity at high altitude in the atmosphere and supply the collected electricity to the electricity storage means 70.

The electricity storage means 70 contains a large number of batteries, is provided on the ground, is connected to the conductive layer 60 through the connection line 61, and is configured to store electricity applied to the conductive layer 60. Furthermore, the electricity storage means 70 is also configured to be equipped with basic protection elements such as lightning protection equipment.

The opening/closing valve 80 is intended to control the flow of air collected by the compression means 30 and supplied to the air tank 10 through the air supply pipe 20, is configured in the shape of a check valve that is opened toward the air tank 10, and allows air collected by the compression means 30 to be supplied to the air tank 10 and prevents air inside the air tank 10 from flowing backward through the air supply pipe 20 and being discharged toward the compression means 30.

The air supply pump 90 is equipment that is operated as needed. When operated, the air supply pump 90 sucks air at high altitude through the compression means 30 and the air supply pipe 20, compresses the sucked air and stores the compressed air in the air tank 10. In the case where the wind is not strong enough or it is necessary to increase air pressure in the air tank 10, when the air supply pump 90 is operated, air is forcibly sucked through the compression means 30 and the air supply pipe 20 and stored in the air tank 10.

The high altitude atmospheric energy storing apparatus configured as described above includes the air tank 10 adapted to store air, the air supply pipe 20 provided such that it extends in a vertical direction and its lower end is connected to the air tank 10, and the compression means 30 provided in the sky, connected to the upper end of the air supply pipe 20, and configured to compress air using the wind and supply the compressed air to the air tank 10 through the air supply pipe 20, thereby enabling air to be compressed by the wind blowing at high altitude and then stored in the air tank 10.

Accordingly, compressed air may be obtained without using a separate power source, and various types of devices are operated by using the high-pressure air thus obtained, thereby providing the advantage of supplying environment-friendly energy.

In particular, the high-altitude air stored in the air tank 10 has a lower temperature than air close to the ground, and thus the maximum power in summer may be considerably reduced when the high-altitude air is used for cooling.

Furthermore, the compression means 30 is connected to the buoyancy body 40 that provides buoyancy so that the compression means 30 floats in the air, so that an advantage is provided in that the compression means 30 may effectively float at high altitude.

Furthermore, the high altitude atmospheric energy storing apparatus further includes the conductive layer 60 formed on the surface of the compression means 30 and the electricity storage means 70 connected to the conductive layer 60 and configured to store electricity applied to the conductive layer 60, thereby providing the advantage of effectively collecting electricity generated in the high-altitude air, storing the collected electricity in the electricity storage means 70, and utilizing the stored electricity in various ways.

Furthermore, the fastening cable 50 connected to the compression means 30 and fastened to the ground at the lower end thereof is further included, and thus the buoyancy body 40 and the compression means 30 are fastened as much as possible and the air supply pipe 20 is set in a vertical state, thereby providing the advantage of constructing an effective energy absorption device.

Furthermore, the high altitude atmospheric energy storing apparatus further includes the opening/closing valve 80 provided in the lower portion of the air supply pipe 20 and configured to selectively open and close the air supply pipe 20 and the air supply pump 90 provided in the lower portion of the air supply pipe 20 and configured to suck high-altitude air through the compression means 30 and the air supply pipe 20, compress the sucked air, and store the compressed air in the air tank 10. When the wind is not strong enough, the high-pressure air stored in the air tank 10 may be prevented from flowing backward through the air supply pipe 20 and the compression means 30 and being discharged. When the wind is not strong enough, the air supply pump 90 is operated to forcibly suck high-altitude cold air and store it in the air tank 10, thereby providing the advantage of utilizing cold air having predetermined pressure.

Although the fastening cable 50 is illustrated as being connected to the compression means 30 in the case of the present embodiment, the fastening cable 50 may be connected to the buoyancy body 40.

Figure 5:
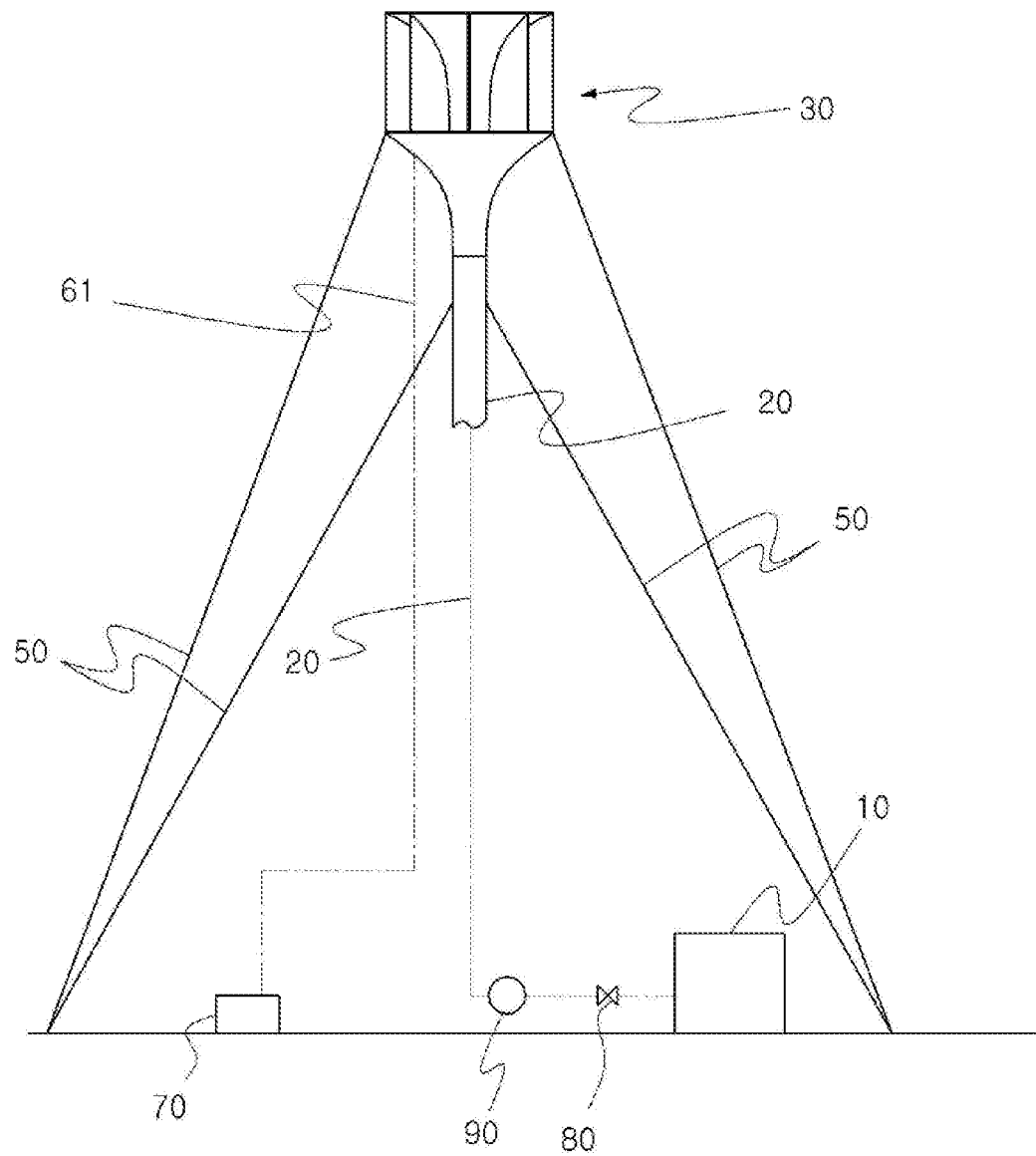
FIGS. 5 to 8 are reference views showing a modification of the high altitude atmospheric energy storing apparatus according to the present invention.

Furthermore, as shown in FIG. 5, the buoyancy body 40 may be omitted depending on the characteristics of an installation area and the physical characteristics of the air supply pipe 20.

In this case, the air supply pipe 20 is made of a synthetic resin or new material having lightweight as well as high dielectric strength and strength, and is configured to support the compression means 30. A plurality of support wires 140, the ends of which are fastened to the ground, is connected to the compression means 30 or the supply pipe 20, and is configured to maintain the air supply pipe 20 in a vertical state.

Figure 6:
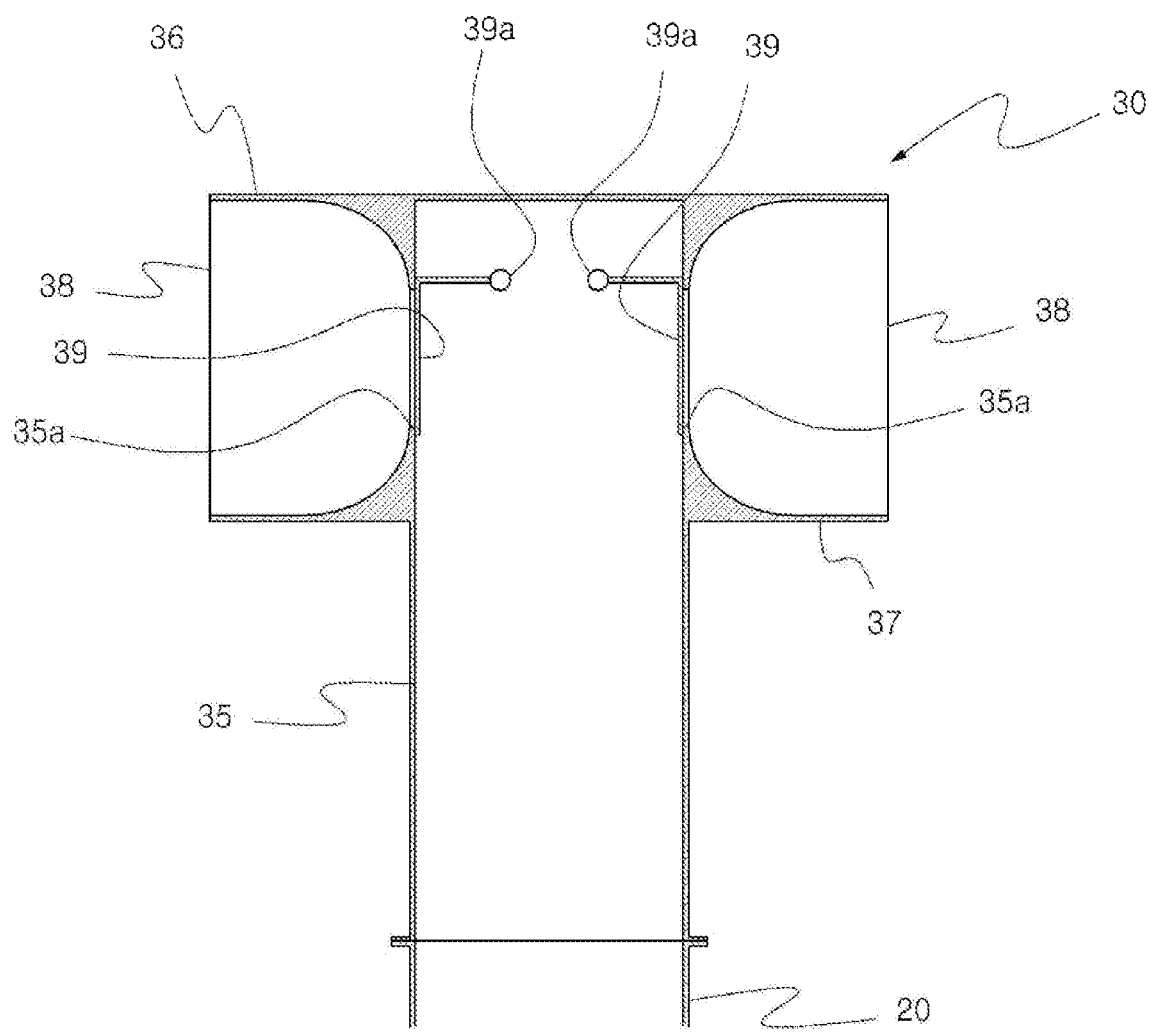
Figure 7:
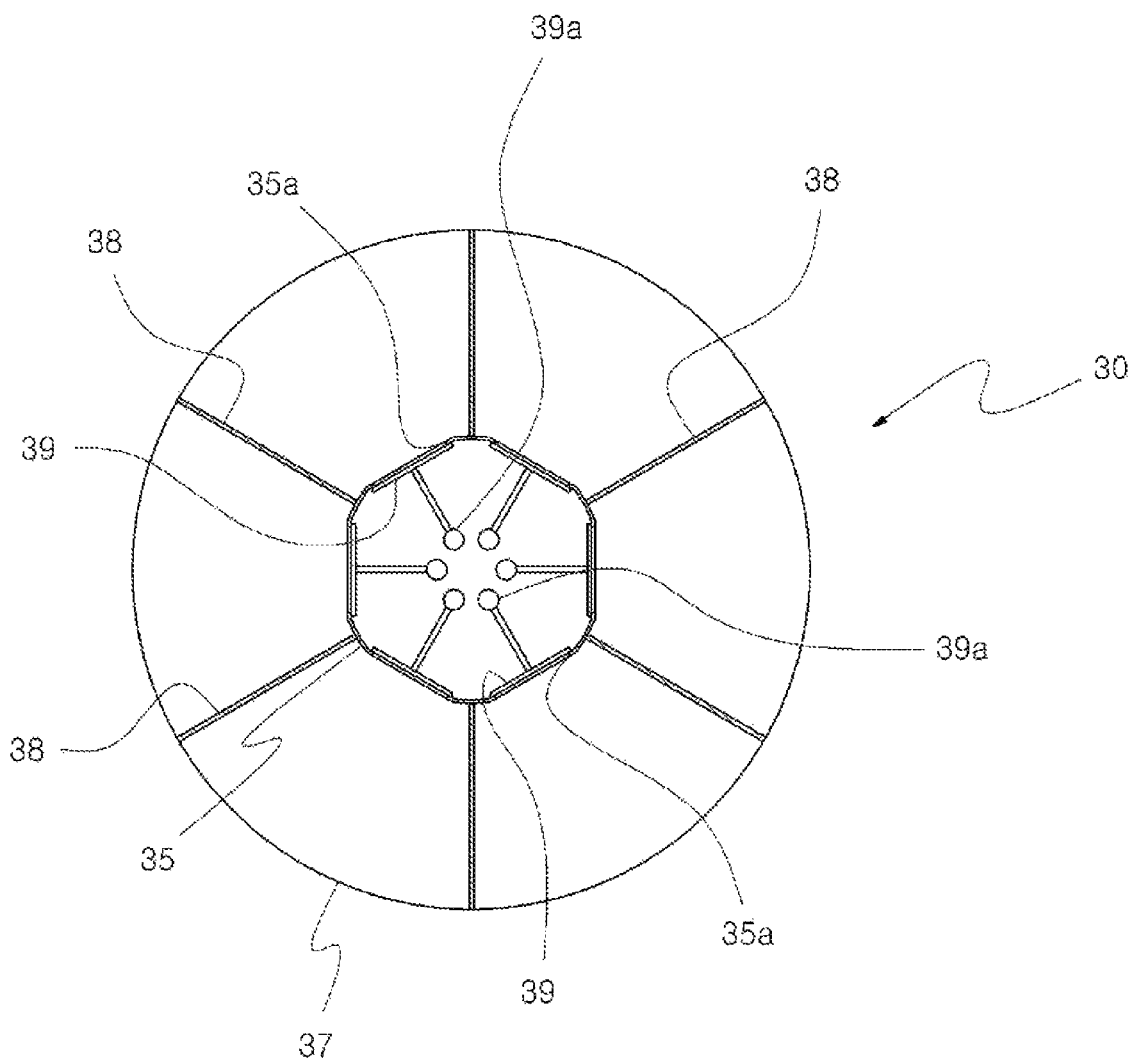
Figure 8:
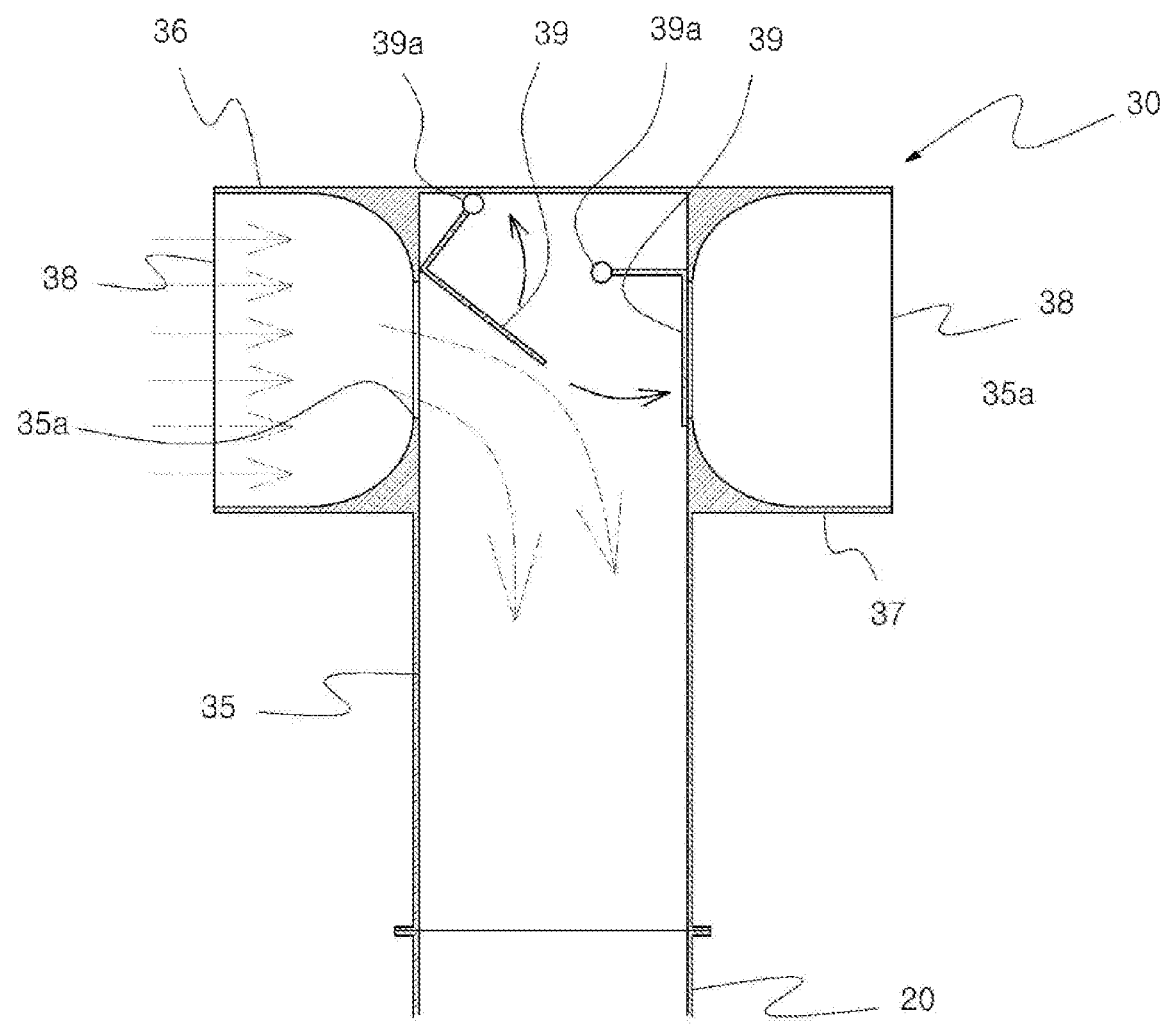

Furthermore, as shown in FIGS. 6 to 8, the compression means 30 may include: a connection tube 35 configured such that it extends in a vertical direction, the top surface thereof is closed, a plurality of air intake hole 35a is formed in the circumference of the upper end thereof, and the air supply pipe 20 is connected to the lower end thereof; upper and lower guide plates 36 and 37 configured to extend outward from the circumferences of the upper end and lower side of the connection tube 35; a plurality of partition plates 38 provided to extend in a radial direction between the upper and lower guide plates 36 and 37 and to divide a space between the upper and lower guide plates 36 and 37; damper plates 39 coupled to the inner circumferential surface of the connection tube 35 to be rotated in a vertical direction and to close the air intake holes 35a when rotated downward; and weights 39a coupled to the inner sides of the damper plates 39 and configured to allow the damper plates 39 to be rotated downward and close the air intake holes 35a.

In this case, the air intake holes 35a are formed in the surface of the connection tube 35 at intervals of predetermined angles. In the compression means 30 configured as described above, when the wind blows from one side, the damper plate 39 provided in front of the air intake hole 35a on the side toward which the wind blows opens the air intake hole 35a while being rotated upward, thereby allowing the wind to flow into the air supply pipe 20 through the connection tube 35, as shown in FIG. 8. Furthermore, the damper plate 39 on the opposite side is not open, which prevents the wind from being discharged, thereby providing the advantage of enabling the wind to effectively flow into the air supply pipe 20.

INDUSTRIAL APPLICABILITY

The present invention may be applied to the field of a high altitude atmospheric energy storing apparatus having a new structure, which is conceived to store the energy of low-temperature air located at high altitude and utilize it as needed.

The invention claimed is:

1. A high altitude atmospheric energy storing apparatus comprising:
    an air tank located on a ground and fabricated to store air with a lower temperature than outside the air tank;
    an air supply pipe provided such that it extends in a vertical direction and its lower end is connected to the air tank; and
    a compression means provided at more than 2 km above the ground and supported by the air supply pipe,
    wherein the compression means is configured to compress air by using a wind and to supply the compressed air to the air tank through the air supply pipe,
    wherein the compression means comprises a plurality of air supply passages formed in radial directions so that the air at the altitude of 2 km or more is compressed by a wind blowing in various directions, and has damper plates that open in one direction so that the compressed air does not escape in the opposite direction and is supplied to the air tank through the air supply pipe.

2. The high altitude atmospheric energy storing apparatus of claim 1, further comprising a buoyancy body, wherein the buoyancy body is equipped with a conductive layer on a surface thereof.

3. The high altitude atmospheric energy storing apparatus of claim 1, further comprising: a conductive layer formed on a surface of the compression means or a buoyancy body, and an electricity storage means connected to the conductive layer and configured to store electricity applied to the conductive layer.

4. The high altitude atmospheric energy storing apparatus of claim 1, further comprising:
   a fastening cable configured such that an upper end thereof is connected to the compression means or a buoyancy body and a lower end thereof is fastened to the ground.

5. The high altitude atmospheric energy storing apparatus of claim 1, further comprising:
   an opening/closing valve provided in an intermediate portion of the air supply pipe and configured to selectively opening and closing a lower portion of the air supply pipe, and
   an air supply pump provided in a lower portion of the air supply pipe and configured to suck high-altitude air through the compression means and the air supply pipe, to compress the sucked air, and to store the compressed air in the air tank.

6. The high altitude atmospheric energy storing apparatus of claim 2, further comprising:
   a fastening cable configured such that an upper end thereof is connected to the compression means or the buoyancy body and a lower end thereof is fastened to the ground.

* * * * *